United States Patent

[11] 3,595,348

[72] Inventor Allen W. Kyllonen
        Pittsburgh, Pa.
[21] Appl. No. 879,231
[22] Filed Nov. 24, 1969
[45] Patented July 27, 1971
[73] Assignee Westinghouse Air Brake Company
        Wilmerding, Pa.

[54] RAILWAY CAR TRUCK BRAKE APPARATUS
    10 Claims, 4 Drawing Figs.
[52] U.S. Cl.............................................. 188/203S,
        188/52, 188/196 PRR
[51] Int. Cl............................................ F16d 65/66
[50] Field of Search......................................... 188/52,
        196, 198, 203 S

[56] References Cited
    UNITED STATES PATENTS
3,101,814  8/1963  Newell ....................... 188/52 X 3,432,011  3/1969  Altherr ..................... 188/203 S X
3,499,507  3/1970  Scott et al. ................. 188/52

Primary Examiner—Duane A. Reger
Attorney—Ralph W. McIntire, Jr.

ABSTRACT: A railway car truck brake apparatus of the type in which two parallel-extending brakeshoe-carrying brake beams are operated to apply and release the brakeshoes to and from the car wheel treads by means of one or more brake cylinder devices secured to the brake beams, each cylinder device being provided with a piston having a piston rod that is operatively connected to the other brake beam and that embodies therein a double acting slack adjuster mechanism that is operable upon the travel of the piston and corresponding piston rod with respect to a fixed part of the brake cylinder device exceeding a chosen value incident to effecting a brake application to either increase or take up slack accordingly as the brakeshoe has or has not moved into contact with the tread surface of the corresponding wheel.

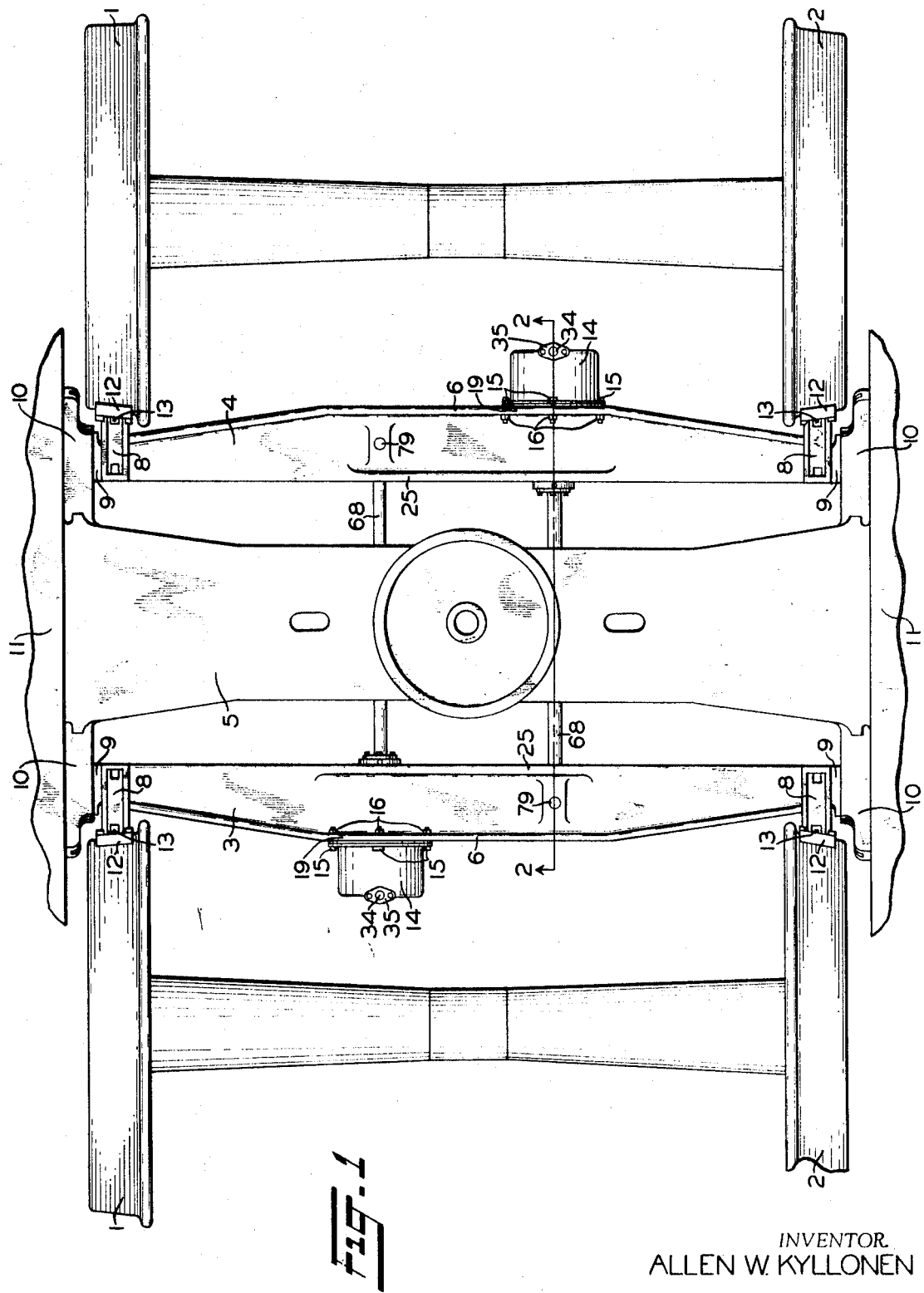

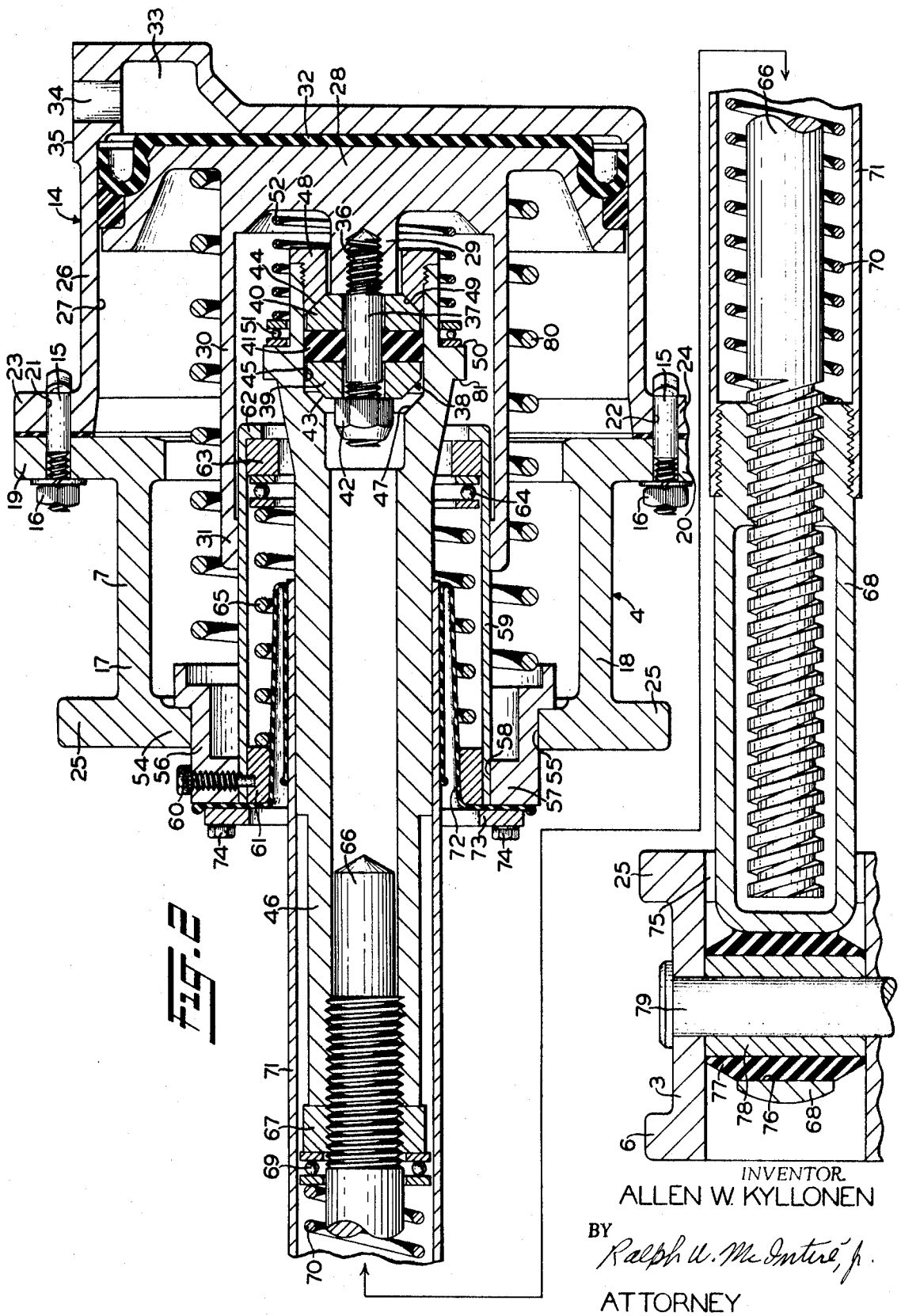

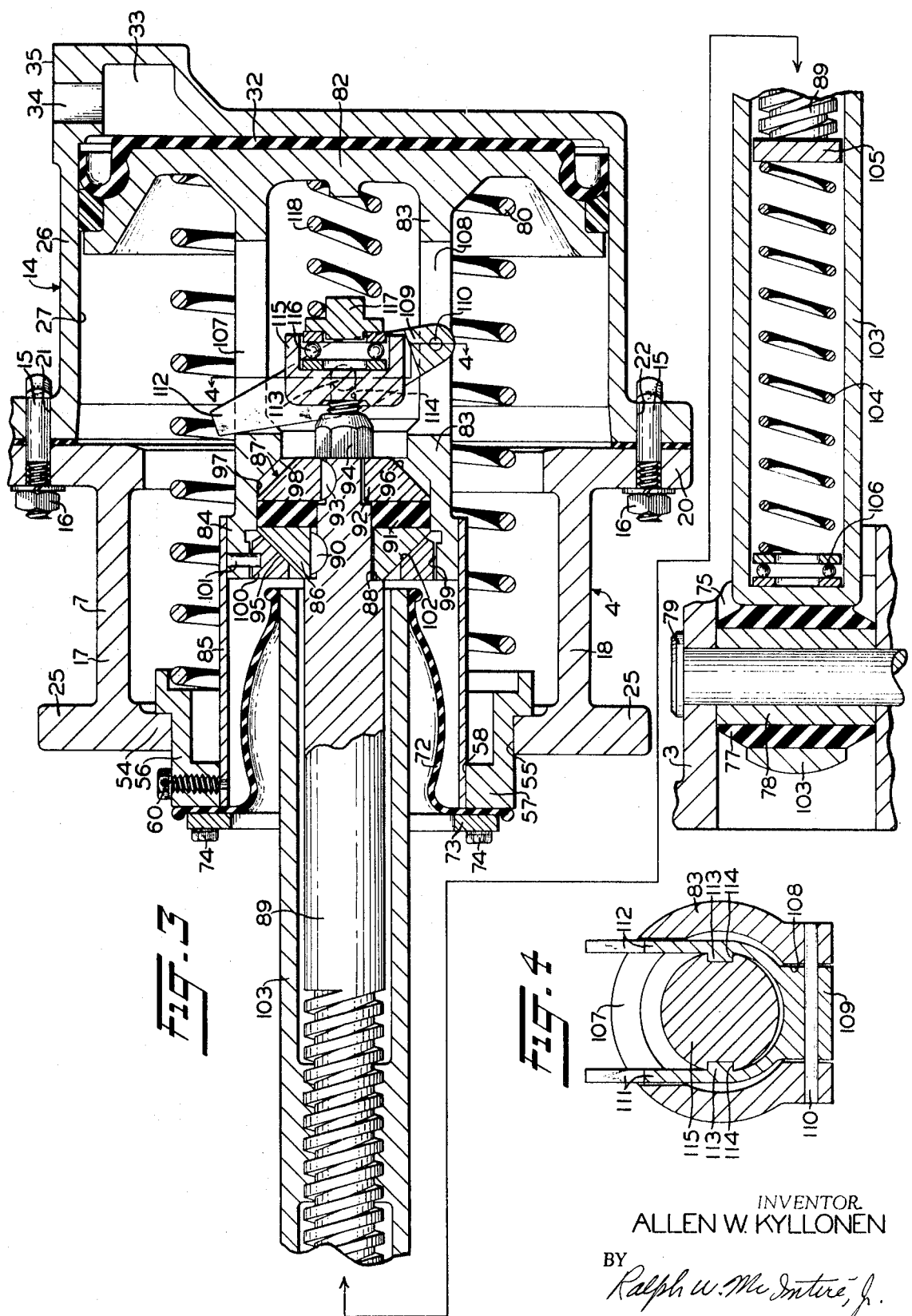

RAILWAY CAR TRUCK BRAKE APPARATUS

BACKGROUND OF THE INVENTION

In U.S. Pat. No. 3,101,814 issued Aug. 27, 1963 to George K. Newell and assigned to the assignee of the present application, there is shown a single-acting automatic slack adjuster mechanism for a railway car truck brake rigging comprising two parallel-extending brake beams each of which has secured thereto a brake cylinder device that is provided with a piston having a two-member piston rod that is operatively connected to the other brake beam. This single-acting slack adjuster mechanism is embodied in the two-member piston rod of each brake cylinder device which has a hollow actuator sleeve carried coaxially on one of the members of the piston rod and yieldably connected to a stationary part of the brake cylinder device so as to have limited universal movement with respect thereto. Upon travel of the piston exceeding a chosen value as a result of brakeshoe wear, a pawl and ratchet mechanism causes rotation of one of the two piston rod members relative to the other to lengthen the piston rod to compensate for wheel tread or brakeshoe wear occurring in any angular position of the piston rod which rod is yieldingly connected respectively at its respective opposite ends to the two brake beams to provide "bailing action."

It is apparent that, when a used wheel and axle assembly is replaced by a new assembly, the diameter of the new wheels is greater than the diameter of the wheels removed. Therefore, it will be understood that the brakeshoe clearance will be less than the nominal amount and that the single-acting slack adjuster mechanism disclosed in the above-mentioned Newell patent is inoperative to let out slack to compensate for this reduction in brakeshoe clearance.

Accordingly, it is the general object of this invention to provide a novel double-acting slack adjuster mechanism so constructed and designed as to be applicable to a brake rigging or apparatus of the type described in the above-mentioned Newell patent and operable in accordance with a variation in the normal brakeshoe clearance as the result of brakeshoe wear or the replacement of a worn wheel and axle assembly with a new assembly having larger diameter wheels to take up or let out slack to thereby maintain normal brakeshoe clearance.

SUMMARY OF THE INVENTION

According to the present invention, a railway car brake apparatus has a brake cylinder device, secured to each of two parallel-extending brakeshoe-carrying brake beams and operatively connected to the other brake beam to effect an application and a brake release, that is provided with an automatically operative double-acting clutch-type slack adjuster mechanism embodied in a piston rod through which a brake-applying force is transmitted from the brake cylinder device carried on one brake beam to the other brake beam. One end of a rod, the external threads formed on a portion of which engage fast travel type of internal threads provided on a hollow sleeve operatively connected to the other brake beam, constitutes one element of a double-acting clutch in that it has formed either on its exterior or on its interior two spaced apart and oppositely inclined conical clutch faces which are disposed between, or between which are disposed, two spaced apart oppositely arranged and correspondingly inclined conical clutch faces formed either on the inside of a hollow boss extending from one side of the piston or on two opposed truncated cones secured to the one side of the piston which second pair of faces constitutes a second clutch element of the double-acting clutch. During brake release, a spring is effective to cause engagement of one corresponding pair of clutch faces. Upon movement of the brake cylinder piston in a brake applying direction through a distance less than or greater than a chosen distance, this spring is rendered effective in response to disengagement of one pair of corresponding clutch faces, and prior to subsequent engagement of the other pair of corresponding clutch faces, to cause rotation between the rod and the hollow sleeve to let out or take up slack to thereby maintain constant the normal clearance between the brakeshoe and the tread surface of its corresponding wheel under brake release conditions.

In the accompanying drawings:

FIG. 1 is a plan view of a brake rigging for a four-wheel (that is, two-axle) car truck, which rigging embodies a slack adjusting mechanism constructed and designed in accordance with the present invention.

FIG. 2 constitutes a cross-sectional view, on an enlarged scale, taken along the line 2–2 of FIG. 1, and looking in the direction of the arrows, showing the details of construction of the brake cylinder device and a first embodiment of a slack adjuster mechanism therefor.

FIG. 3 is a cross-sectional view, showing a second embodiment of a slack-adjusting mechanism similar to that of FIG. 2 but in which the internal clutch faces are formed on a hollow boss extending from one side of the brake cylinder piston and the external clutch faces are formed at one end of the piston rod.

FIG. 4 is a vertical cross-sectional view, taken along the line 4–4 of FIG. 3 and looking in the direction of the arrows, showing additional structural details.

Referring to FIG. 1 of the drawings, reference numerals 1 and 2 designate, respectively, the wheels secured to opposite ends of each of two axles of a two-axle four-wheel railway car truck.

The brake rigging shown in FIG. 1 comprises a pair of cast brake beams 3 and 4 extending crosswise of the car truck and in parallel spaced relation to each other and to a truck bolster 5. The brake beams 3 and 4 are symmetrically arranged on opposite sides of the truck bolster 5 and are movably supported at each end on the side frame members of the truck in a manner hereinafter described.

The brake beams 3 and 4 each, in cross section, have generally the shape of a U-channel with the outer ends of the flanges thereof curved through an angle of substantially 90° to form upper and lower ribs, respectively, the upper rib being designated and shown in FIG. 1 by the reference numeral 6. The brake beams 3 and 4 are constructed, as hereinafter described and shown in FIG. 2, to provide integral therewith a nonpressure head 7 of a brake cylinder, which nonpressure head 7 is cast integral with each of the respective brake beams.

As shown in FIG. 1, a brake head 8 is cast integral with each of the brake beams 3 and 4 at each end thereof adjacent to and on the inboard side of one of a pair of guide feet 9 which are also cast integral with each of the respective brake beams at the opposite ends thereof. Each guide foot 9 is a flat generally L-shaped member, the outer leg of which is slidably supported in a groove in a wear plate and guide member 10 which is secured to a truck side frame 11. The wear plate and guide members and the guide feet serve to support the brake beams 3 and 4 at the proper height above the rails (that is, somewhat below the horizontal diameter of the wheels), the grooves in the wear plate and guide members 10 being at a slight angle to the horizontal to permit bodily movement of the brake beam in the direction radially of the associated wheels when a brake application is made.

Each brake head carries either a "composition" type or a "cast iron" type of brakeshoe 12 for contact with the tread of an associated wheel. In the "composition" type of brakeshoe, the material constituting the brake block has a relatively high and uniform friction characteristic as compared to the relatively low and nonuniform characteristic of the "cast iron" type of brakeshoe having a brake block of cast iron. In customary manner, each shoe 12 has a backing plate provided with a key bridge to receive a key 13 for removably locking the shoe to the brake head 8.

The brakeshoes 12 are operated into and out of contact with the associated wheels 1, 2 by means of a pair of fluid pressure motors or brake cylinders 14 which, as shown in FIG. 2, are respectively secured to the brake beams 3 and 4 by a plurality of bolts 15 and nuts 16, two of each being shown in FIG. 2. The brake cylinders 14 are symmetrically located on opposite sides of the central longitudinal axis of the car truck, respectively intermediate the center and one end of the respective brake beams 3 and 4. Since each brake beam 3 and 4 and it one brake cylinder 14 bolted thereto is identical, only the brake beam 4 will be described in detail.

As can be seen from FIGS. 1 and 2, the nonpressure head 7 is cast integral with the U-shaped channel constituting the brake beam 4 by having the upper and lower flanges thereof elongated or expanded, as indicated at 17 and 18 in FIG. 2. Likewise, the corresponding ribs 6 are elongated or expanded to form bolting flanges 19 and 20 that extend in opposite directions to which flanges the brake cylinder 14 is secured by bolts 15 which extend through bores 21 and 22, respectively, in corresponding bolting flanges 23 and 24 formed, as shown in FIG. 2, at the left-hand end of the brake cylinder 14 and adapted to abut, respectively, the bolting flanges 19 and 20 in which are provided corresponding bores coaxial with the bores 21 and 22.

Also, as shown in FIGS. 1 and 2, on the web side of the U-channel constituting the brake beams 3 and 4 and extending outwardly from the outside faces of the upper and lower flanges thereof and in spaced apart relation to the respective expanded flanges 17 and 18 of the U-channels are a second pair of oppositely extending longitudinal ribs only one of which appears in FIG. 1, it being denoted by the numeral 25. The inside face of each of this pair of ribs is spaced from the corresponding rib 6 a distance that is substantially equal to the width of the flange portions 17 and 18 less the thickness or width of the corresponding rib of the pair of ribs. This pair of ribs also extends equal distances on opposite sides of the longitudinal center line of the car truck along the outside edge of the respective upper and lower flanges of the U-channel.

As shown in FIG. 2, a body or casing 26 of the brake cylinder 14 has a bottom bore 27 in which a piston 28 is slidably operable.

Formed integral with the left-hand side of the piston 28, as viewed in FIG. 2 of the drawings, is a central boss 29 and a coaxial sleeve 30 at the left-hand end of which is formed an inturned flange 31.

Secured to the right-hand side of the piston 28 is a packing cup 32 which, while the piston 28 occupies the position shown in FIG. 2, contacts the end wall or pressure head of the brake cylinder body 26 to form between the piston 28 and the closed end of the brake cylinder 14 a pressure chamber 33 to which fluid under pressure may be supplied through a passageway 34 formed in the body 26, which passageway extends upward from the chamber 33 to a flat face 35 formed on the body 26. A flange fitting (not shown) is secured to the flat face 35 by a pair of capscrews (not shown). The flange fitting receives one end of a hose (not shown) the opposite end of which is connected to the brake cylinder pipe leading from the usual brake control valve device (not shown) of the air brake system on railway cars. Fluid under pressure supplied to the pressure chamber 33 through the hose, flange fitting and passageway 34 causes movement of the brake cylinder 14 and the brake beam 4 in one direction and the piston 28, a piston rod hereinafter described and the brake beam 3 in the opposite direction to effect braking contact of the brakeshoes 12, carried by the brake beams 3 and 4, with the treads of their respective associated wheels.

As shown in FIG. 2, the boss 29 is provided with a screw-threaded bottom bore 36 in which is received the right-hand threaded end of a stud 37. Mounted on this stud 37 is a three-part clutch member 38 which comprises a pair of spaced apart rigid metallic annular clutch elements 39 and 40 and an annular resilient clutch element 41 disposed therebetween. The left-hand threaded end of the stud 37 receives a nut 42 which, when tightened, clamps the resilient clutch element 41 between the metallic clutch elements 39 and 40 which have at their respective opposite ends inclined external clutch faces 43 and 44.

The clutch member 38 is disposed in a counterbore 45 that extends inward from the right-hand end of a hollow clutch or brake rod 46 and has formed at its left-hand end an inclined internal clutch face 47 having the same angle of inclination as the external clutch face 43. The right-hand end of the counterbore 45 is provided with internal screw threads for screw-threaded engagement with external screw threads formed on an annular plug 48 that at its left-hand end has an inclined internal clutch face 49 having the same angle of inclination as the external clutch face 44.

Adjacent its right-hand end the clutch rod 46 is provided with a shoulder 50 against which rests a thrust bearing 51 between which and the piston 28 is interposed a spring 52 which is effective to bias the inclined internal clutch face 49 on plug 48 toward the external clutch face 44 formed on the annular clutch element 40 of the clutch member 38.

As shown in FIG. 2, formed at the left-hand end of the nonpressure head 7 is an inturned flange 54 that forms a bore 55 in which is disposed an annular spring seat 56. Formed at the left-hand end of this annular spring seat 56 is an inturned flange 57 that forms a bore 58 in which is disposed the left-hand end of a sleeve 59. This sleeve 59 is anchored to the inturned flange 57 by a plurality of dog-pointed capscrews 60, only one of which appears in FIG. 2, these capscrews also serving to anchor against movement an annular spring seat 61 disposed in the left-hand end of the sleeve 59. This sleeve 59 extends through the inturned flange 31 and at its right-hand end is provided with an inturned flange 62 against which rests an annular stop member 63 that in turn supports a thrust bearing 64. Interposed between this thrust bearing 64 and the spring seat 61 is a spring 65 which has substantially the same strength as the spring 52 while the parts occupy the position shown in FIG. 2 and is effective to normally bias the stop member 63 against the inturned flange 62.

As shown in FIG. 2, the left-hand end of the hollow clutch rod 46 is provided with internal screw threads that have screw-threaded engagement with external screw threads formed near the right-hand end of a rod 66, it being noted that a lock nut 67 abuts the left-hand end of the hollow clutch rod 46 to lock the rod 66 to this clutch rod 46.

As can be seen from FIG. 2, the left-hand end of the rod 66 is externally threaded with a non-self-locking type of screw thread which has screw-threaded engagement with internal non-self-locking screw threads provided in the right-hand end of a hollow piston rod member 68 which is operatively connected to the brake beam 3 in a manner hereinafter described. Interposed between the right-hand end of the piston rod member 68 and the outer race of a thrust bearing 69 which rests against the lock nut 67 is a precompressed spring 70 the strength of which is somewhat less than that of the hereinbefore-mentioned springs 52 and 65 in order that this spring 52 normally bias the inclined internal clutch face 49 formed on the plug 48 against the external clutch face 44 formed on the clutch element 40.

Disposed in concentric surrounding relation to the spring 70 is a sleeve 71 the left-hand end of which is provided with internal screw threads that have screw-threaded engagement with external screw threads formed on the right-hand end of piston rod member 68.

The right-hand end of the sleeve 71 is supported on the hollow clutch rod 46 so as to provide a turning fit therebetween and is surrounded by one end of a rubber boot 72 that is provided to prevent the entrance of water, ice and dirt to the interior of the sleeves 30 and 59. The opposite end of this boot 72 has formed integral therewith an out-turned flange that is disposed between the inturned flange 57 of the spring seat 56 and an annular plate 73 that is secured to the flange 57 as by a plurality of capscrews 74, two of which appear in FIG. 2.

As shown in FIG. 2, the left-hand end of the piston rod member 68 extends through an opening 75 formed in the web of the U-channel that constitutes the brake beam 3 and is disposed between the upper and lower flanges of this channel. This left-hand end of the piston rod member 68 is provided with a bore 76 in which is disposed a first bushing 77 constructed of some suitable resilient material such as, for example, rubber. A second bushing 78 constructed of some suitable metallic material, such as, for example steel, is disposed within the resilient bushing 77 the outside diameter of this bushing 78 being substantially the same as the inside diameter of the resilient bushing 77. The length of the bushing 78 is substantially equal to the distance between the upper and lower flanges of the U-channel constituting the brake beam 3 to which the piston rod member 68 is operatively connected by means such as, for example a headed pin 79 and a cotter key (not shown), the pin 79 extending through the bushing 78 and coaxial bores provided in the above-mentioned upper and lower flanges.

Let it be assumed that the chamber 33 of each of the brake cylinders 14 shown in FIG. 1 of the drawings is devoid of fluid under pressure and that a corresponding release spring 80, interposed between the spring seat 56 and the piston 28, has moved the corresponding piston 28 to the position shown in FIG. 2. In this position of each of the brake cylinders 14 and pistons 28, the brake beams 3 and 4 will be in a brake released position in which the brakeshoes 12 carried by the respective brake beams are out of braking contact with their corresponding wheels 1 and 2. When the brake beams occupy their release position, the distance from the braking surface of each brakeshoe and its corresponding wheel tread is nominally eleven-sixteenths inch whether the brakeshoes 12 are of the cast iron type or are of the "composition" type.

When it is desired to effect a brake application, fluid under pressure is admitted simultaneously to the pressure chamber 33 in each of the brake cylinders 14 through flexible hose (not shown) which are connected to a pipe leading from the brake cylinder port of the brake control valve device of the usual air brake system on railway cars. Fluid under pressure thus supplied to the chamber 33 formed between these respective pistons 28 and the closed end or pressure head of each brake cylinder 14 is effective to move the pistons 28 and cylinders 14 in opposite directions. As the pistons 28 and cylinders 14 are moved in opposite directions, the brake beams 3 and 4 also move in opposite directions since the pistons 28 are each connected to another brake beam through the corresponding piston rod 68 and pin 79 and the cylinders 14 are each carried by one of the brake beams other than the said another brake beam. As the brake beams move in opposite directions, the brakeshoes 12 carried by the brake beams are brought into braking contact with the tread surface of the wheels of the truck to effect a braking action on the wheels.

As the beams 3 and 4 are moved in opposite directions, as described above, these beams are supported and guided by the guide feet 9 (FIG. 1) as these feet have sliding contact in corresponding grooves in the wear plate guide members 10. As hereinbefore mentioned, the orientation of the wear plate and guide members 10 is such that the brake beams 3 and 4 and the brakeshoes 12 carried thereby are moved radially toward the wheels.

It should be understood that in view of the symmetrical disposition of the brake cylinders on the one and on the other brake beam on opposite sides of the longitudinal axis of the truck and the corresponding symmetrical relation of the points at which the piston rods are connected to the other brake beam, the simultaneous supply of fluid under pressure at the same pressure to the pressure chamber 33 of both brake cylinders 14 produce substantially equalized forces of application of the brakeshoes to the wheels.

Referring to FIG. 2, it will be apparent that when fluid under pressure is supplied to chamber 33, piston 28 will move in the direction of the left hand and the brake cylinder 14, together with the brake beam 4 to which it is secured, will move in the direction of the right hand.

As the piston 28 moves in the direction of the left hand, as viewed in FIG. 2, against the yielding resistance of the release spring 80, this movement of the piston 28 is transmitted to the clutch rod 46 via the spring 52, thrust bearing 51 and shoulder 50 so that this rod 46 moves with the piston 28. The clutch rod 46 in turn has a screw-threaded connection with the right-hand end of rod 66 which is operatively connected to the hollow piston rod member 68 by the non-self-locking threads on these members. Finally, the piston rod member 68 is connected by the pin 79 to the brake beam 3.

From the foregoing, it is apparent that the two brake beams 3 and 4 (FIG. 1) are moved in opposite directions in response to the supply of fluid under pressure to the chamber 33 in the two brake cylinders 14 until the brakeshoes 12 are brought into braking contact with the tread surfaces of their corresponding wheels 1 and 2.

Assuming proper of nominal brakeshoe clearance, it should be understood that while the piston 28 and clutch rod 46 occupy the release position shown, a shoulder 81 formed on the clutch rod 46 is disposed away from the right-hand side of the annular stop member 63 a distance equal to the distance from the braking surface of each brakeshoe 12 to its corresponding wheel tread which, as aforesaid, is nominally eleven-sixteenths inch. Therefore, the braking surface of each brakeshoe 12 is moved into contact with the tread surface of its corresponding wheel substantially at the same time as the shoulder 81 abuts the stop member 63.

The fluid under pressure present in the chamber 33 and acting on the right-hand side of the piston 28 in each brake cylinder 14 is now transmitted through the central boss 29 to the annular clutch element 40 of the clutch member 38 whereupon the piston 28 and clutch member 38 will be moved in the direction of the left hand against the yielding resistance of the spring 52. This movement of the clutch member 38 in the direction of the left hand is effective to first move the inclined external clutch face 44 on the clutch element 40 out of clutching contact with the inclined internal clutch face 49 on the plug 48 and thereafter, subsequent to further movement of the piston 28 and clutch member 38, to move the inclined external clutch face 43 on the clutch element 39 into clutching contact with the inclined internal clutch face 47 on the hollow clutch rod 46. The fluid under pressure acting on each piston 28 is now transmitted through the boss 29, clutch member 38, hollow clutch rod 46, rod 66, piston rod member 68, bushings 77 and 78, and pin 79 to the corresponding brake beam.

The fluid under pressure present in the chamber 33 of each brake cylinder 14 also transmits a force to the brake beam to which the respective brake cylinder is secured via the corresponding brake cylinder casing 26 which force acts on this brake beam in a direction opposite the direction of the force transmitted from the piston 28 of this brake cylinder to the other brake beam in the manner described above. Accordingly, it is apparent from the foregoing that two equal forces act on each of the two brake beams 3 and 4 in the direction to press the braking surface of each of the two brakeshoes 12 carried by each of these brake beams against the tread surface of the corresponding wheel of the car truck to effect a braking action on these wheels.

When it is desired to release the brake application, fluid under pressure supplied to the chamber 33 of both brake cylinders 14 is vented therefrom in the usual manner to atmosphere through the passageway 34, the flange fitting and flexible hose (not shown) to the brake control valve device of the car brake system, whereupon the force of each release spring 80 acting through the corresponding spring seat 56 moves the respective brake cylinder 14 and its piston 28 in a brake releasing direction to move the brake beams 3 and 4 toward each other and the brakeshoes 12 correspondingly away from the tread surface of the wheels of the truck to effect a brake release.

Due to the inclination of the grooves in the wear plate and guide members 10, the brake beams tend to return by action of gravity to their normal symmetrical relation with respect to the truck bolster 5, in which position the clearance between the brakeshoes on one brake beam and their associated wheels is substantially equal to the clearance between the brakeshoes on the other brake beam and their associated wheels.

It will be understood that, when fluid under pressure is released from the chamber 33 and the release spring 80 moves the piston 28 toward its release position, the spring 52 is rendered effective to transmit a force to the clutch rod 46 via the thrust bearing 51 which force acts in the direction of the left hand as viewed in FIG. 2, and also to transmit a force to the clutch member 38 via the boss 29, stud 37 and nut 42 which force acts in the direction of the right hand. Consequently, the corresponding brakeshoe 12 is maintained against the tread surface of its associated wheel as the inclined external clutch face 43 on the clutch element 39 of the clutch member 38 is moved out of clutching contact with the inclined internal clutch face 47 on the clutch rod 46 subsequent to which the inclined external clutch face 44 on the clutch element 40 of clutch member 38 is moved into clutching contact with the inclined internal clutch face 49 on the plug 48. Thereafter, the continued movement of the piston 28, boss 29 and clutch member 38 in the direction of the right hand, as viewed in FIG. 2, by spring 80 in response to the release of fluid under pressure from the chamber 33, is effective via the clutch rod 46, rod 66, piston rod member 68, bushings 77 and 78, and pin 79 to exert a pull on the corresponding brake beam to move it toward the other brake beam. Consequently, the two brake beams are moved toward each other to effect a brake release, or in other words to the position in which they are shown in FIG. 1.

Assume that a brake application has been effected in the manner hereinbefore described, and that, during the brake application, the braking surface of the brakeshoes 12 wear away. As this wearing away of the braking surface of the brakeshoes 12 occurs, the fluid under pressure acting on the pistons 28 and brake cylinder casings 26 is transmitted in the manner hereinbefore described to the brake beams 3 and 4 and the brakeshoes 12 carried thereby to maintain the braking surface of these shoes 12 in braking contact with the tread surface of the corresponding wheels and thus the braking force on each wheel.

It will be remembered that at the time the braking surface of the brakeshoes 12 was moved into contact with the tread surface of the corresponding wheels, the shoulder 81 on each of the clutch rods 46 was moved into abutting relationship with the right-hand side of the corresponding stop member 63. Therefore, it will be apparent from FIG. 2 that, as the clutch rod 46 is moved in the manner explained above in the direction of the left hand in response to the wearing away of the braking surface of the brakeshoes 12, the stop member 63 and thrust bearing 64 are moved in the direction of the left hand against the yielding resistance of the spring 65 so that the stop member 63 is moved out of abutting relationship with the inturned flange 62 on the right-hand end of the sleeve 59.

Now let it be supposed, that subsequent to this wearing away of the braking surface of the brakeshoes 12 while the brake application was in effect, the brakes are released by venting fluid under pressure from the chamber 33 in each brake cylinder 14 to atmosphere in the usual manner hereinbefore described.

As the piston 28 in each brake cylinder 14 is now moved by the spring 80 in the direction of the right hand, as viewed in FIG. 2, in response to the venting of fluid under pressure from the corresponding chamber 33, the spring 52 which has the same strength as the spring 65, is effective to maintain the shoulder 81 against the right-hand side of the stop member 63 and at the same time transmit a force to the clutch member 38 via the boss 29, stud 37 and nut 42 so that this clutch member 38 tends to be moved in a direction away from the clutch rod 46 or in other words the inclined external clutch face 43 on the clutch member 38 tends to be moved away from the inclined internal clutch face 47 on the clutch rod 46 thereby relieving or releasing the braking or locking force pressing these clutch faces together.

As the force pressing these clutch faces together is thus reduced, the precompressed spring 70 is rendered effective via the thrust bearing 69 to spin the clutch rod 46, rod 66, and stop member 63 relative to the piston rod member 68 by reason of the non-self-locking threads provided on rod 66 and piston rod member 68 so that the inclined internal clutch face 47 on the clutch rod 46 tends to follow and remain in clutching contact with the external clutch face 43 on the clutch member 38 until the expansion of the spring 65 causes the right-hand side of the stop member 63 to be moved into abutting relationship with the inturned flange 62 on the sleeve 59.

Now as the piston 28 continues to be moved in the direction of the right hand by the release spring 80, the spring 52 will expand to, via the thrust bearing 51, maintain the shoulder 81 against the right-hand side of the stop member 63 and simultaneously move the clutch member 38 relative to the rod 46 until the inclined external clutch face 44 on the clutch member 38 is moved into clutching contact with the inclined internal clutch face 49 on the plug 48 which constitutes a part of the clutch rod 46. Subsequent to this movement of the clutch face 44 into clutching contact with the clutch face 49, the release spring 80 will continue to move the piston 28 in the direction of the right hand until this piston 28 reaches the position shown in FIG. 2 in which it abuts the end of the casing 26 of the respective brake cylinder 14.

From the foregoing it is apparent that the spinning of the respective clutch rods 46 and rods 66 relative to the corresponding piston rods 68 is effective to increase the distance between the two brake beams 3 and 4 a distance equal to the amount of wear of two opposite and aligned brakeshoes 12 carried by these brake beams 3 and 4. Thus the effective length of the piston rods 68 is increased to thereby maintain constant brakeshoe clearance while the brakes are released. Accordingly, it is apparent that the brakeshoe wear occuring while a brake application is in effect is compensated for, or the the slack resulting therefrom taken up, by increasing the effective length of the piston rod members 68 upon initiating a brake release subsequent to such wear.

The above-described slack adjuster mechanism is also operatively effective to let out slack if at the time a brake application is effected, the brakeshoe clearance is less than its nominal value which, as hereinbefore stated, may be, for example, eleven-sixteenths of an inch.

If the brakeshoe clearance is less than its nominal value at the time a brake application is effected in the manner hereinbefore described, the braking surface of the brakeshoes 12 will be moved into contact with the tread surface of the corresponding wheels prior to movement of the shoulder 81 into abutting relationship with the annular stop member 63. With the braking surface of the brakeshoes 12 in contact with the tread surface of the corresponding wheels, the continued movement of the piston 28 in the direction of the left hand, as viewed in FIG. 2, is effective to move the clutch member 38 in this direction to cause the external clutch face 44 on the clutch member 38 to move away from the inclined internal clutch face 49 on the plug 48. Since shoulder 81 is not in abutting relationship with the stop member 63 at this time, as the external clutch face 44 on the clutch member 38 is moved away from the inclined clutch face 49 on the plug 48, the spring 52 is rendered effective via the thrust bearing 51, and shoulder 50 to rotate or "spin" clutch rod 46, and rod 66 relative to the now stationary piston rod member 68 in the direction to decrease the effective length of the piston rod.

Upon movement of the shoulder 81 on the clutch rod 46 into abutting contact with the stop member 63, the rotation or "spinning" of the clutch rod 46 and rod 66 ceases. Thereafter, the continued movement of the clutch member 38 in the direction of the left hand, as viewed in FIG. 2, in response to movement of the piston 28 in this same direction, is effective to move the external clutch face 43 on the clutch member 38 into clutching contact with the inclined internal clutch face 47 on the now stationary clutch rod 46. The fluid under pressure present in the chamber 33 of the brake cylinders 14 is now rendered effective in the manner hereinbefore described to transmit a braking force to the tread surface of each of the four wheels of the truck to effect a brake application.

When this brake application is subsequently released in the manner hereinbefore described, and the brake heads 6 and brakeshoes 12 (FIG. 1) are moved to their release position, the distance between the braking surface of the brakeshoes 12 and the tread surface of the corresponding wheels will be the nominal brakeshoe clearance since each clutch rod 46 and rod 66 has been advanced along or moved relative to the corresponding piston rod member 68 a distance equal to the distance between the shoulder 81 and the stop member 63 at the time the braking surface of the brakeshoes 12 moved into contact with the tread surface of the corresponding wheels.

Referring to FIG. 1, when one of the brakeshoes 12 has completely worn out and it is to be replaced with a new shoe, it is necessary to first reduce the length of that piston rod member 68 that is operatively connected to the brake beam that carries this brakeshoe since the thickness of the new brakeshoe is greater than that of the worn shoe. The length of this piston rod member 68 may be reduced by a workman first inserting a pry bar, while the brakes are released, between the braking surface of this brakeshoe 12 and the tread surface of the corresponding wheel, and thereafter rocking this pry bar about the tread surface of this wheel as a fulcrum in the direction to transmit a force to this brakeshoe 12 which acts in the direction of the brake beam that carries this shoe. This force thus exerted by the pry bar on this brakeshoe 12 is transmitted to the corresponding brake head 8 and thence via the brake beam carrying this brake head to the piston rod member 68 operatively connected to this brake beam by the corresponding pin 79 whereupon this piston rod member 68 is moved in the direction of the right hand, as viewed in FIG. 2 of the drawings.

The above-mentioned movement of this piston rod member 68 in the direction of the right hand is transmitted to the rod 66 and clutch rod 46 via the non-self-locking threads on this piston rod member 68 and the rod 66. Consequently, as the piston rod member 68, rod 66 and clutch rod 46 are moved in the direction of the right hand by the workman rocking the pry bar in the manner described above, the internal clutch face 49 on the plug 48 is moved out of clutching contact with the external clutch face 44 on the clutch member 38.

As the internal clutch face 49 on the plug 48, which has screw-threaded engagement with the right-hand end of the clutch rod 46, is thus moved out of clutching contact with the external clutch face 44 on the clutch member 38, the spring 52, which transmits a force to the clutch rod 46 via the thrust bearing 51 and shoulder 50, is rendered effective to cause the clutch rod 46 and rod 66 to "spin" relative to the piston rod member 68 and thereby travel longitudinally relative to this piston rod member 68 in the direction of the left hand, as viewed in FIG. 2, as the piston rod member 68 is moved in the direction of the right hand in response to the force transmitted thereto from the pry bar.

From the foregoing, it is apparent that the workman, by use of the pry bar, can cause the effective length of the piston rod member 68 to be reduced sufficiently to enable him to replace the worn brakeshoe 12 with a new brakeshoe. By first driving the corresponding brakeshoe key 13 (FIG. 1) upward by the application of a series of hammer blows to the lower end of this key, the workman may remove this key and thereafter the worn out brakeshoe 12. The new brakeshoe can then be secured to the corresponding brake head 8 by means of this same brakeshoe key 13.

In FIGS. 3 and 4 of the drawings, there is shown a brake rigging constructed in accordance with a second embodiment of the invention. According to this second embodiment of the invention, the brake rigging shown in FIGS. 3 and 4 differs from that shown in FIGS. 1 and 2 in that the clutch member having the inclined external clutch faces is mounted on or carried by the rod provided with non-self-locking threads, and the inclined internal clutch faces are formed on the interior of a sleeve member carried by the piston. Furthermore, in this second embodiment of the invention the stop member is immovably secured to the nonpressure head of the brake cylinder and is effective to cause rocking of a spring biased lever, pivotally mounted on the sleeve member, to remove the force of a spring that biases one external clutch face on the clutch member against the corresponding internal clutch face on the sleeve whereupon the rod having the non-self-locking threads and carrying the clutch member is spun by a spring until the other external clutch face on the clutch member is moved into clutching contact with its corresponding internal clutch face on the sleeve thus increasing the length of this rod to thereby compensate for brakeshoe wear. Accordingly, like reference numerals have been used to designate the structure shown in FIGS. 3 and 4 which is identical to that shown in FIGS. 1 and 2. Only such features of the structure and operation of the embodiment of the invention shown in FIG. 2 which differ from that of the embodiment of FIGS. 1 and 2 will be hereinafter described.

According to the embodiment of the invention disclosed in FIGS. 3 and 4, a piston 82 is slidably mounted in the bottom bore 27 formed in the casing 26 of each brake cylinder 14 (FIG. 1). Formed integral with the left-hand side of the piston 82 is a sleeve 83 at the left-hand end of which is formed an out-turned flange or guide member 84 that is slidably disposed in a sleeve member 85. The left-hand end of this sleeve member 85 is anchored to the inturned flange 57 of the spring seat 56 by a plurality of dog-pointed capscrews 60 in the same manner as the sleeve 59 shown in FIG. 2.

As shown in FIG. 3, a first metallic annular clutch element 86 of a three-part clutch member 87 rests against a shoulder 88 formed on a clutch or brake rod 89 adjacent its right-hand end and is secured to this rod 89 by a key 90. An annular resilient clutch element 91 is disposed between the clutch element 86 and a second metallic annular clutch element 92 which is secured to the rod 89 by a key 93. The right-hand threaded end of the rod 89 receives a nut 94 which when tightened, clamps the resilient clutch element 91 between the metallic clutch elements 86 and 92 that have at their respective opposite ends inclined external clutch faces 95 and 96 that correspond to the clutch faces 43 and 44 in the first embodiment of the invention.

The clutch member 87 is disposed in a counterbore 97 that extends inward from the left-hand end of the sleeve 83 and has formed at its right-hand end an inclined internal clutch face 98 having the same angle of inclination as the external clutch face 96. Disposed in a counterbore 99 coaxial with the counterbore 97 and on the left-hand side of the clutch member 87 is an annular member 100 that is secured to the sleeve 83 by a plurality of dowel pins 101 extending through corresponding bores in the out-turned flange 84 and into coaxial bottomed bores extending inward from the periphery of this annular member 100. The right-hand side of the annular member 100 is provided with an inclined internal clutch face 102 that has the same angle of inclination as the external clutch face 95.

As can be seen from FIG. 3, the left-hand end of the rod 89 is externally threaded with a non-self-locking type of screw thread which has screw-threaded engagement with internal non-self-locking threads provided in a hollow piston rod member 103 intermediate the ends thereof. As shown in FIG. 3, the left-hand end of the piston rod member 103 is secured to the brake beam 3 in the same manner as is the piston rod member 68 shown in FIG. 2.

In order to increase the effective length of the piston rod member 103 subsequent to brakeshoe wear in a manner hereinafter described, a spring 104 is disposed within the hollow piston rod member 103 and interposed between a spring seat 105 that rests against the left-hand end of the clutch rod 89 and a thrust bearing 106 that rests against the left-hand end of this hollow piston rod member 103.

Referring to FIGS. 3 and 4, it will be seen that the sleeve 83 is provided with an upper slot 107 and a lower slot 108. As best shown in FIG. 4, the lower end of a U-shaped lever 109 is pivotally mounted on a pin 110 that extends through the lower slot 108 and has its opposite ends anchored in the sleeve 83. This lever 109 comprises two spaced apart arms 111 and 112 formed integral therewith and each of these arms has formed on the side thereof adjacent the other arm a boss 113. These bosses 113 are disposed in two horizontally extending and diametrically opposite slots 114 formed on the outer periphery of a cup-shaped member 115 that is disposed between the two arms 111 and 112 of the U-shaped lever 109.

Disposed in the cup-shaped member 115 is a thrust bearing 116 against which rests a spring seat 117 and interposed between this seat 117 and the piston 82 is a spring 118 that is stronger than the spring 104 so that it is normally effective via the spring seat 117, thrust bearing 116, cup-shaped member 115 and clutch rod 89 to bias the external clutch face 95 on the clutch member 87 into clutching contact with the internal clutch face 102 on the annular member 100, as shown in FIG. 3 of the drawings.

Considering now the operation of the second embodiment of the invention, it will be understood that while the chamber 33 of each of the brake cylinders 14 is devoid of fluid under pressure, the springs 80 are effective to move the corresponding pistons 82 to the position shown in FIG. 3. Consequently, the brake beams 3 and 4 will be in a brake released position in which the brakeshoes 12 carried by the respective brake beams are out of braking contact with their corresponding wheels 1 and 2, as in the first embodiment of the invention.

When it is desired to effect a brake application, fluid under pressure is admitted simultaneously to the pressure chamber 33 in each of the brake cylinders 14 which fluid under pressure is effective to move the pistons 82 and cylinders 14 and likewise the brake beams 3 and 4 (FIG. 1) in opposite directions, as in the first embodiment of the invention, until the brakeshoes 12 are brought into braking contact with the tread surfaces of the corresponding wheels of the truck to effect a braking action on these wheels.

As the piston 82 shown in FIG. 3 moves in the direction of the left hand against the yielding resistance of the spring 80, this movement of the piston 82 is transmitted to the clutch rod 89 via the spring 118, spring seat 117, thrust bearing 116 and cup-shaped member 115 so that this rod 89 moves with the piston 82. The clutch rod 89 is operatively connected to the piston rod member 103 by the non-self-locking threads on these members and the piston rod member 103 is connected to the brake beam 3 by the pin 79. Consequently, it is apparent that the two brake beams 3 and 4 (FIG. 1) are moved in opposite directions, as stated above.

Assuming proper or nominal brakeshoe clearance, it will be understood that while the pistons 82 occupy the release position shown in FIG. 3, the arms 111 and 112 of the U-shaped lever 109 are disposed away from the right-hand end of the sleeve member 85 a distance equal to the nominal brakeshoe clearance. Therefore, the braking surface of each brakeshoe 12 is moved into contact with the tread surface of its corresponding wheel substantially at the same time as the arms 111 and 112 of lever 109 abut the right-hand end of the sleeve 85.

The fluid under pressure in the chamber 33 and acting on the right-hand side of the piston 82 in each brake cylinder 14 is now effective to move the pistons 82 and sleeve 83 in the direction of the left hand and thereby first move the corresponding internal clutch face 102 on the annular member 100 carried by the sleeve 83 out of clutching contact with the external clutch face 95 on the clutch element 87 and thereafter, subsequent to further movement of the piston 82 and sleeve 83 in the direction of the left hand, to move the internal clutch face 98 on the sleeve 83 into clutching contact with the external clutch face 96 on the clutch element 87. The fluid under pressure present in the chambers 33 and acting on the right-hand side of the corresponding pistons 82 is now transmitted through the sleeves 83, clutch members 87, clutch rods 89, piston rod members 103 and pins 79 to the brake beams 3 and 4 to force the brakeshoes 12 carried thereby against the tread surface of the corresponding wheels to effect a braking action on these wheels.

When it is desired to release the brake application, the fluid under pressure present in the chambers 33 is vented in the usual manner to atmosphere, whereupon the force of the springs 80 effects movement of the brakeshoes 12 away from the tread surface of the corresponding wheels to the release position in the manner hereinbefore described in connection with the first embodiment of the invention.

It will be understood that as the pistons 82 are initially moved in the direction of the right hand, as viewed in FIG. 2, by the springs 80, the springs 118 maintain the braking surface of the shoes 12 in contact with the tread surface of the corresponding wheels so that the internal clutch face 98 on the sleeve 83 is moved out of clutching contact with the external clutch face 96 on the clutch member 87 subsequent to which the external clutch face 95 on this clutch member 87 is moved into clutching contact with the internal clutch face 102 on the annular member 100. Thereafter, the continued movement of the pistons 82 in the direction of the right hand, as viewed in FIG. 3 return these pistons, the clutch members 87, the clutch rods 89 and the piston rod members 103 to the position shown in FIG. 3.

Assume that a brake application has been effected in the manner hereinbefore described, and that, during the brake application, the braking surface of a brakeshoe 12 carried by one of the brake beams wears away. As this wearing away of the braking surface of this brakeshoe 12 occurs, the fluid under pressure acting on the piston 82 in the brake cylinder 14 carried by the other brake beam is effective to cause further movement of the piston 82 in the direction of the left hand, as viewed in FIG. 3, which movement is transmitted via the corresponding sleeve 83, clutch member 87, clutch rod 89, piston rod member 103 and pin 79 to the one brake beam to maintain the braking surface of this shoe 12 in braking contact with the tread surface of the corresponding wheel and thus the braking force on this wheel.

It will be remembered that at the time the braking surface of this brakeshoe 12 was moved into contact with the tread surface of the corresponding wheel, the arms 111 and 112 of the lever 109 in the brake cylinder 14 carried by the other brake beam were moved into abutting relationship with the right-hand end of the corresponding sleeve 85. Therefore, it will be apparent from FIG. 3 that, as the piston 82, and sleeve 83 in this brake cylinder 14 are moved in the direction of the left hand in response to the wearing away of the braking surface of this brakeshoe 12, the lever 109 is rocked clockwise, as viewed in FIG. 3, about the pin 110 to thereby compress the spring 118 and move cup-shaped member 115 out of contact with the right-hand end of clutch rod 89 thus removing the force of the spring 118 from this clutch rod.

Now let it be supposed that, subsequent to this wearing away of the braking surface of this brakeshoe 12 while the brake application was in effect, the brakes are released by venting fluid under pressure from the chambers 33 in the brake cylinders 14 to atmosphere in the usual manner hereinbefore described.

As the pistons 82 and sleeves 83 are now moved in the direction of the right hand, as viewed in FIG. 3, by the corresponding springs 80 in response to the venting of fluid under pressure from the chambers 33, the internal clutch face 98 on each sleeve 83 is moved out of clutching contact with the corresponding external clutch face 96 on the clutch member 87. It will be remembered that the force of the spring 118 has been removed from the right-hand end of the clutch rod 89. Consequently, it will be apparent that, upon movement of the internal clutch face 98 on the sleeve 83 in the direction of the right hand, as viewed in FIG. 3, out of clutching contact with the external clutch face 96 on the clutch member 87, the spring 104 is rendered effective via the spring seat 105 to exert a thrust or force in the direction of the right hand, as viewed in FIG. 3, on the clutch rod 89 which will cause rotation or "spinning" of this clutch rod 89 and the clutch member 87 carried thereby so that this clutch rod 89 and the clutch member 87 are moved longitudinally in the direction of the right hand, as viewed in FIG. 3, relative to or along the piston rod member 103 as they "spin" thereabout to increase the effective length of the piston rod thereby compensating for brakeshoe wear. The clutch rod 89 and the clutch member 87 will thus move longitudinally in the direction of the right hand, as viewed in FIG. 2, relative to the piston rod member 103, so that the external clutch face 96 on the clutch member 87 tends to "chase" or keep in clutching contact with the internal clutch face 98 on the sleeve 83 as this sleeve and the piston 82 are moved in the direction of the right hand by the corresponding release spring 80.

However, as this piston 82 and sleeve 83 are moved in the direction of the right hand and away from the right-hand end of the sleeve member 85, the spring 118 is rendered effective via the spring seat 117, thrust bearing 116, and cup-shaped member 115 to rock the lever 109 counterclockwise about the pin 110 to the position in which this lever 109 is shown in FIG. 3. As the lever 109 is thus rocked counterclockwise to the position shown in FIG. 3, the force of the spring 118 is reapplied to the right-hand end of the clutch rod 89 via spring seat 117, thrust bearing 116 and cup-shaped member 115. Since the spring 118 is stronger than the spring 104, as hereinbefore stated, when the force of this spring 118 is reapplied to the right-hand end of the clutch rod 89, it is effective to prevent further "spinning" of the clutch rod 89 and clutch member 87 by the spring 104.

From the foregoing, it is apparent that upon initiating a brake release subsequent to brakeshoe wear, the clutch rod 89 is moved longitudinally in the direction of the right hand, as viewed in FIG. 3, relative to the piston rod member 103, as it is "spun" thereabout, a distance corresponding to the amount of the wearing away of the braking surface of the brakeshoe 12 occurring while the preceding brake application was in effect, so that the effective length of the piston rod member 103 is increased to thereby maintain constant brakeshoe clearance while the brakes are released.

Subsequent to cessation of longitudinal movement of the clutch rod 89 and clutch member 87 relative to the piston rod member 103 in response to the reapplication of the force of the spring 118 to the right-hand end of the clutch rod 89, the continued movement of the piston 82 and sleeve 83 by the spring 80 in the direction of the right hand, as viewed in FIG. 3, in response to the venting of fluid under pressure from the chamber 33, is effective to move the internal clutch face 102 on the annular member 100 secured to the sleeve 83 by the dowel pins 101 into clutching contact with the external clutch face 95 on the clutch member 87.

After the internal clutch face 102 on the annular member 100 is moved into clutching contact with the external clutch face 95 on the clutch member 87 in the manner just explained, each of the pistons 82, sleeves 83, clutch members 87, clutch rods 89, and piston rod members 103 will continue to be moved by the corresponding release spring 80 in the direction of the right hand, as viewed in FIG. 2, in response to the final venting of all of the fluid under pressure from the chambers 33 until the packing cups 32 carried by the pistons 82 abut the right-hand end of the corresponding casing 26. This further movement of the piston rod members 103 is effective via the pins 79 to move the brake beams 3 and 4 in the direction of each other, as viewed in FIG. 1, and the braking surface of the brakeshoes 12 carried thereby away from the tread surface of the corresponding wheels.

From the foregoing, it is apparent that the brakeshoe wear occurring while a brake application is in effect is compensated for, or the slack resulting therefrom taken up, by increasing the effective length of the piston rod members 103 upon initiating a brake release subsequent to such wear.

As in the first embodiment of the invention, the slack adjuster mechanism is also operatively effective to let out slack if at the time a brake application is effected, the brakeshoe clearance is less than its nominal value.

If the brakeshoe clearance is less than its nominal value, when a brake application is effected in the manner hereinbefore described, the braking surface of the brakeshoes 12 will be moved into braking contact with the tread surface of the corresponding wheels prior to the arms 111 and 112 of levers 109 abutting the right-hand end of the corresponding sleeve member 85. Accordingly, as the pistons 82 and sleeves 83 continued to be moved by the fluid under pressure in the corresponding chamber 33, each internal clutch face 102 on the annular member 100 carried by each sleeve 83 is moved out of clutching contact with the external clutch face 95 on the corresponding clutch member 87. As each internal clutch face 102 is thus moved away from its corresponding external clutch face 95, the corresponding spring 118, which is stronger than the spring 104, is rendered effective via the spring seat 117, thrust bearing 116, and cup-shaped member 115 to rotate or "spin" the clutch member 87 and clutch rod 89 relative to the now stationary piston rod member 103 to decrease the effective length of the piston rod.

Upon movement of the pistons 82 and sleeves 83 far enough for the arms 111 and 112 of the levers 109 to abut the right-hand end of the corresponding sleeve member 85, these levers 109 are rocked clockwise, as viewed in FIG. 3, to remove the thrust or force of the springs 118 from the clutch members 87 and clutch rods 89 whereupon "spinning" of these members and rods cease. Thereafter, the continued movement of these pistons 82 and sleeves 83 in the direction of the left hand, as viewed in FIG. 3, is effective to move the internal clutch face 98 on each sleeve 83 into clutching contact with the external clutch face 96 on the corresponding clutch member 87 which is now stationary. The fluid under pressure present in the chamber 33 of the brake cylinders 14 is now rendered effective to transmit a braking force to the tread surface of each of the four wheels of the truck to effect a brake application.

When this brake application is subsequently released, the distance between the braking surface of the brakeshoes 12 and the tread surface of the corresponding wheels will be the nominal brakeshoe clearance since each clutch rod 89 has been moved relative to the corresponding piston rod member 103 in the direction to reduce the effective length of these piston rod members a distance equal to the distance between the arms 111 and 112 of the levers 109 and the right-hand end of the corresponding sleeve member 85 at the time the braking surface of the brakeshoes 12 moved into contact with the tread surface of the corresponding wheels.

When one of the brakeshoes 12 has been completely worn out and it is to be replaced with a new shoe, the length of the corresponding piston rod member 103 can be reduced by use of a pry bar in the manner hereinbefore described for the first embodiment of the invention.

Having now described the invention, what I claim as new and desire to secure by Letters Patent, is:

1. A brake rigging for a four-wheel type of railway vehicle truck having a transverse axis and a longitudinal axis perpendicular thereto, which brake rigging comprises the combination of two brake beams extending in spaced substantially parallel relation to the transverse axis of the car truck and guidably supported at the ends thereof on the truck for bodily movement longitudinally of the truck, brakeshoe means carried inboard of and adjacent to each guidably supported end of each brake beam for causing a braking effect to be exerted on the corresponding wheel of the truck, a pair of brake cylinder casings each of which is secured to a corresponding one of said two brake beams inboard of one of said brakeshoe means on opposite sides of and in symmetrically spaced relation to the longitudinal axis of the truck along the length of said corresponding brake beam, a piston operable in each said brake cylinder casing and having a lost-motion connection with one end of a piston rod that at its opposite end is anchored to the other of said two brake beams at corresponding opposite sides of and in symmetrically spaced relation to the longitudinal axis of the truck, each of said brake cylinder casings having a pressure chamber to which fluid under pressure may be supplied, wherein the improvement comprises:

a. a double-acting slack adjuster mechanism interposed between and operatively connecting each respective piston and said one end of the corresponding piston rod, to form said lost-motion connection, each of said double-acting slack adjuster mechanism comprising:
i. a double-clutch mechanism having:
1. a first clutch element constituting a brake rod having a pair of axially spaced clutch faces formed adjacent one end and being provided with external non-self-locking screw threads adjacent the other,
2. a second clutch element carried by said piston in coaxial relation to said first clutch element and having a pair of axially spaced clutch faces for respective cooperation with said clutch faces on said annular clutch element,
3. said piston rod constituting a nut member having internal non-self-locking screw threads engaging the external non-self-locking screw threads on said brake rod whereby said brake rod is rotatably mounted in said piston rod,
ii. a first spring disposed between said piston and said brake rod for exerting a force in a brake applying direction on said brake rod via said first clutch element and said second clutch element independently of said piston, and being yieldable upon further movement of said piston in a brake applying direction, subsequent to movement of said brakeshoe means into braking contact with a corresponding pair of wheels of the truck, to provide disengagement of said first and second clutch elements and apply a force causing rotation in one direction of said first clutch element and brake rod relative to said piston rod to decrease the effective length of said piston rod, and
iii. a pair of spring seats formed respectively on said piston rod and said brake rod,
iv. a second spring having less strength than said first spring and being interposed and compressed between said pair of spring seats, and
v. means including said second spring being effective upon movement of said piston in a brake releasing direction, subsequent to movement of said piston in a brake applying direction a distance greater than a chosen distance incidental to brakeshoe wear to disengage said first and said second clutch means to cause rotation of said first clutch element and brake rod in an opposite direction of said one direction relative to said piston rod to increase the effective length of said piston rod.

2. A brake rigging, as recited in claim 1, further characterized in that said pair of clutch faces of said first clutch element and said pair of clutch faces of said second clutch element are conical and oppositely inclined.

3. A brake rigging, as recited in claim 1, further characterized in that one of said clutch elements is annular with its corresponding pair of clutch faces being formed therein a certain chosen distance one from the other, and the other of said clutch elements is cylindrical and movably mounted within said one annular clutch element with its corresponding pair of clutch faces being formed at the respective opposite ends thereof in parallel relation to said first pair of clutch faces, the length of said cylindrical element being less than said certain chosen distance.

4. A brake rigging for a four-wheel type of railway vehicle truck having a transverse axis and a longitudinal axis perpendicular thereto, which brake rigging comprises the combination of two brake beams extending in spaced substantially parallel relation to the transverse axis of the car truck, and guidably supported at the ends thereof on the truck for bodily movement longitudinally of the truck, brakeshoe means carried inboard of and adjacent to each guidably supported end of each brake beam for causing a braking effect to be exerted on the corresponding wheel of the truck, a pair of brake cylinder casings each of which is secured to one of said brake beams inboard of one of said brakeshoe means on opposite sides of and in symmetrically spaced relation to the longitudinal axis of the truck along the length of said one brake beam, a piston operable in each said brake cylinder casing and having a lost-motion connection with one end of a piston rod that at its opposite end is anchored to the other of said brake beams at corresponding opposite sides of and in symmetrically spaced relation to the longitudinal axis of the truck, each of said brake cylinder casings having a pressure chamber to which fluid under pressure may be supplied, wherein the improvement comprises:
a. a double-acting slack adjuster mechanism interposed between and operatively connecting each respective piston and said one end of the corresponding piston rod to form said lost-motion connection, each of said double-acting slack adjuster mechanisms comprising:
i. a double-clutch mechanism having:
1. an annular clutch element constituting a brake rod having a pair of axially spaced clutch faces formed adjacent one end and being provided with external non-self-locking screw threads adjacent the other, and
2. a second clutch element carried by said piston in coaxial relation to said annular clutch element and having a pair of axially spaced clutch faces for respective cooperation with said clutch faces on said annular clutch element,
3. said piston rod constituting a nut member having internal non-self-locking screw threads engaging the external non-self-locking screw threads on said brake rod whereby said brake rod is rotatably mounted in said piston rod,
ii. two spaced apart stops on the respective brake cylinder casing and on the axis of movement of said brake rod,
iii. a movable stop member, disposed between said two stops and in the pathway of movement of said annular clutch element,
iv. a first spring disposed about said brake rod and interposed between one of said two stops and said movable stop member for normally biasing said movable stop member in the brake release direction against the other of said two stops,
v. a second spring interposed between said piston and said annular clutch element and having the same strength as said first spring for constantly exerting a force in a brake applying direction on said brake rod via said annular clutch element independently of said piston, and yieldable upon further movement of said piston in a brake applying direction, subsequent to movement of said brakeshoe means into braking contact with a corresponding pair of wheels of the truck and prior to engagement of said annular clutch element with said movable stop member, to disengage said first and second clutch elements and to provide a force on said brake rod to rotate in one direction said annular clutch element and brake rod relative to said piston rod to decrease the effective length of said piston rod, and
vi. a pair of spring seats formed respectively on said piston rod and said brake rod,
vii. a third spring having less strength than said first and second springs and being interposed between said pair of spring seats cooperatively related with said first spring so that upon movement of said piston in a brake releasing direction, subsequent to movement of said piston in a brake applying direction a distance sufficient to cause said annular clutch member to move said movable stop member out of abutting relation with said other stop against the yielding resistance of said first spring, to disengage said first and second clutch elements and apply a force on said brake rod to provide rotation of said annular clutch element and brake rod relative to said piston rod in a direction opposite to said one direction to increase the effective length of said piston rod.

5. A brake rigging, as recited in claim 4, further characterized in that said brake rod is provided with shoulder means for engaging and moving said movable stop away from said stop against the yielding resistance of said first spring in response to said further movement of said piston in a brake applying direction.

6. A brake rigging, as recited in claim 4, further characterized in that said brake rod comprises: a. a hollow rod having adjacent one end said pair of conical and oppositely disposed clutch faces each spaced a chosen distance one from the other, and adjacent the other end internal self-locking screw threads, and b. a solid rod having adjacent one end external self-locking screw threads having screw-threaded engagement with said internal self-locking screw threads of said hollow rod, and adjacent the other end said external non-self-locking screw threads whereby the length of said brake rod can be varied in accordance with the wheel base of the railway vehicle truck.

7. A brake rigging, as recited in claim 4, further characterized in that said movable stop member is moved out of abutting relationship with said other stop by said annular clutch member only upon the occurrence of wear of said brakeshoe means while a brake application is in effect.

8. A brake rigging, as recited in claim 1, further characterized by a stop carried by each respective brake cylinder casing, and a lever carried by and pivotally mounted on the corresponding piston, said lever being so disposed between said corresponding first spring and said brake rod as to be rockable, subsequent to movement thereof by said piston into abutting relation with said stop, in a direction to remove the force exerted by said first spring on said brake rod whereby said second spring is rendered effective, upon movement of said piston in an opposite direction, to cause rotation in said opposite direction of said first clutch element and brake rod relative to said piston rod to increase the effective length of said piston rod.

9. A brake rigging, as recited in claim 8, further characterized by a slotted sleeve carried by each respective piston, the corresponding lever being disposed in said slot and pivotally mounted on said sleeve.

10. A brake rigging, as recited in claim 9, further characterized in that said pair of axially spaced clutch faces of said second clutch element are formed on said sleeve on the side of said slot opposite said piston.